United States Patent
Kim et al.

(10) Patent No.: US 11,246,098 B2
(45) Date of Patent: Feb. 8, 2022

(54) METHOD AND APPARATUS FOR WAKE-UP OF COMMUNICATION NODE IN VEHICLE NETWORK

(71) Applicants: HYUNDAI MOTOR COMPANY, Seoul (KR); KIA MOTORS CORPORATION, Seoul (KR)

(72) Inventors: Dong Ok Kim, Goyang-si (KR); Kang Woon Seo, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/412,658

(22) Filed: May 15, 2019

(65) Prior Publication Data
US 2019/0357146 A1   Nov. 21, 2019

(30) Foreign Application Priority Data
May 15, 2018 (KR) .................. 10-2018-0055297

(51) Int. Cl.
  G06F 1/12   (2006.01)
  H04W 52/02   (2009.01)
  H04W 4/40   (2018.01)

(52) U.S. Cl.
  CPC ......... *H04W 52/0274* (2013.01); *H04W 4/40* (2018.02); *H04W 52/0229* (2013.01)

(58) Field of Classification Search
  None
  See application file for complete search history.

(56) References Cited

U.S. PATENT DOCUMENTS

| | | | |
|---|---|---|---|
| 2011/0022699 A1* | 1/2011 | Powell | H04L 12/40039 709/224 |
| 2012/0280575 A1* | 11/2012 | Kim | H02J 7/00036 307/104 |
| 2014/0053011 A1* | 2/2014 | Diab | G06F 1/26 713/340 |
| 2014/0081518 A1* | 3/2014 | Son | H04L 12/40 701/36 |
| 2015/0169028 A1* | 6/2015 | Shibukawa | G03G 15/5004 713/320 |
| 2016/0364247 A1* | 12/2016 | Yun | G06F 9/4418 |
| 2016/0366646 A1* | 12/2016 | Yun | G06F 9/4406 |
| 2017/0003707 A1* | 1/2017 | Henry | G06F 13/24 |
| 2018/0183963 A1* | 6/2018 | Yamashita | G06F 3/1212 |
| 2018/0278897 A1* | 9/2018 | Seaman | H04N 7/181 |
| 2019/0303778 A1* | 10/2019 | Desai | G06N 5/043 |

* cited by examiner

*Primary Examiner* — Brandon M Renner
(74) *Attorney, Agent, or Firm* — Morgan, Lewis & Bockius LLP

(57) ABSTRACT

An operation method of a communication node in a vehicle network may include detecting a wake-up event; generating a wake-up signal including an identifier indicating a wake-up reason corresponding to the wake-up event based on a wake-up table, the wake-up table configured for storing the wake-up reason corresponding to the wake-up event, a target communication node configured to be woken up by the wake-up reason, and an operation power configured to be supplied to the target communication node; and transmitting the wake-up signal.

4 Claims, 8 Drawing Sheets

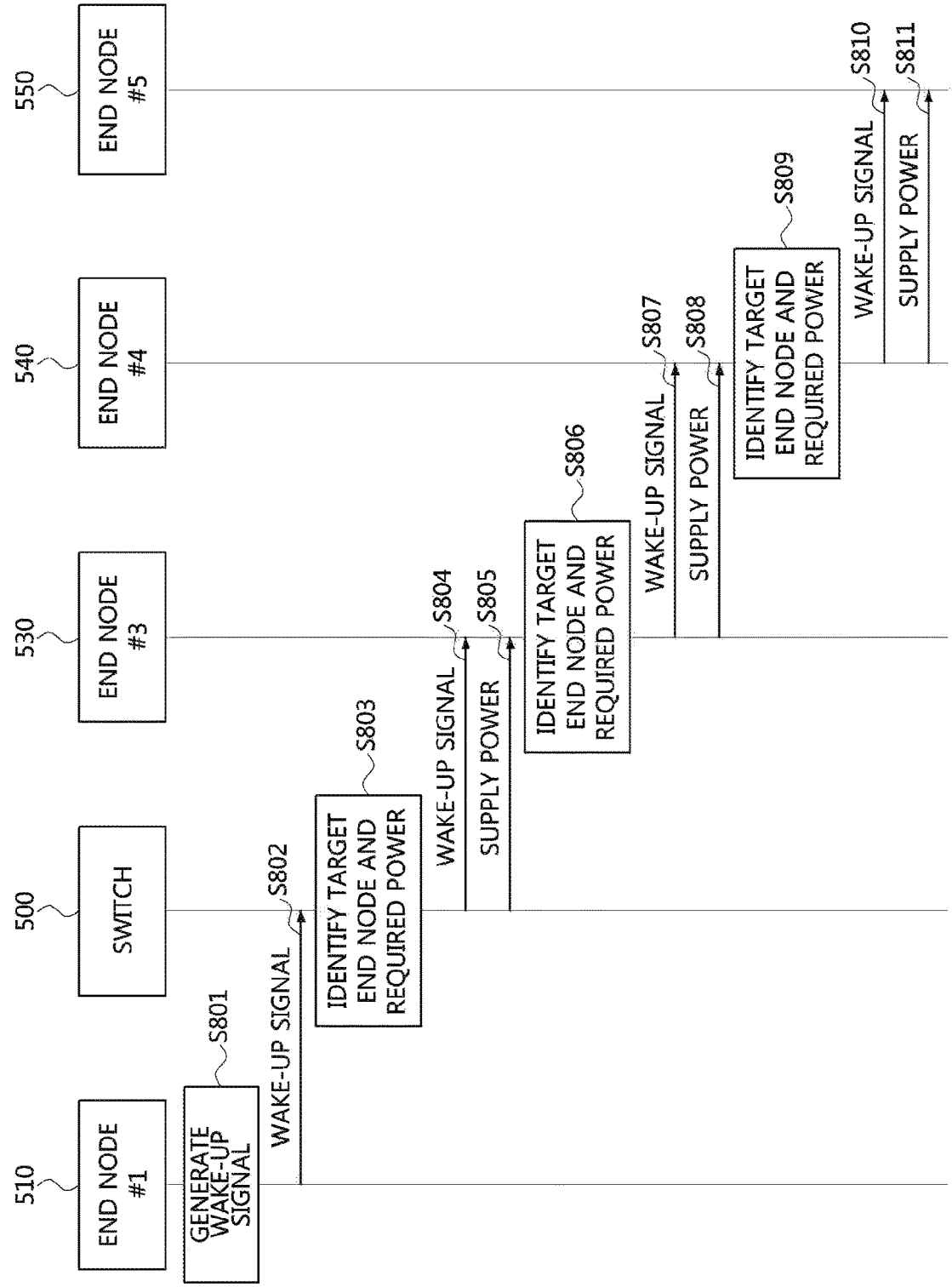

METHOD AND APPARATUS FOR WAKE-UP OF COMMUNICATION NODE IN VEHICLE NETWORK

CROSS-REFERENCE TO RELATED APPLICATIONS

The present application claims priority to Korean Patent Application No. 10-2018-0055297, filed on May 15, 2018, the entire contents of which is incorporated herein for all purposes by this reference.

BACKGROUND OF THE INVENTION

Field of the Invention

The present invention relates to vehicle network technology, and more specifically, to a technique for waking up a communication node without a procedure for information exchange between a powered device (PD) and a power sourcing equipment (PSE).

Description of Related Art

Electronic devices installed in a vehicle have been increased significantly in their number and variety along with recent digitalization of vehicle parts. The electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, may support a higher transmission rate than the CAN or the FlexRay-based network. However, applying the MOST-based network to vehicle networks may be costly. Due to these limitations, an Ethernet-based network is often utilized as a vehicle network. The Ethernet-based network may support bi-directional communication through one pair of windings and may support a transmission rate of up to 10 Gbps.

A power line for power supply in a vehicle network may be separated from a data line used for communications between electronic devices in the vehicle network. In the instant case, the electronic device may acquire power through the power line and receive data through the data line. Alternatively, power and data in the vehicle network may be transmitted through a single line. For example, power may be transmitted through the data line used for communications. In the instant case, since both power and data may be transmitted through a single line, the use of wires may be reduced.

The communication nodes supporting a power over data line (PoDL) may be classified into a communication node including a PD (hereinafter referred to as a 'PD communication node'), a communication node including a PSE (hereinafter referred to as a 'PSE communication node'), and a communication node including both of the PSE and the PD (hereinafter referred to as a 'PD/PSE communication node'). When the PD communication node operates in an active mode by receiving a wake-up signal in a sleep state, the following PD/PSE information exchange procedure may be performed.

The PD communication node (or, the PD/PSE communication node operating in a PD mode) may transmit a PD detection signal. The PSE communication node (or, the PD/PSE communication node operating in a PSE mode) may detect the PD detection signal. The PSE communication node may confirm that the PD communication node is a PD based on the PD detection signal. The PSE communication node may request a type and a power class requirement (i.e., the amount of required power) of the PD communication node to the PD communication node. The PD communication node may transmit information on the type and power class requirement of the PD according to the request of the PSE communication node. The PSE communication node may supply a power to the PD communication node based on the information received from the PD communication node. Meanwhile, since the above-described PD/PSE information exchange procedure may be performed in a wake-up procedure, a wake-up of a communication node may be delayed.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and an apparatus configured for waking up a communication node based on a wake-up table without a procedure of exchanging information between PD and PSE in a vehicle network.

In accordance with embodiments of the present invention, an operation method of a communication node in a vehicle network may include detecting a wake-up event; generating a wake-up signal including an identifier indicating a wake-up reason corresponding to the wake-up event based on a wake-up table, the wake-up table configured for storing the wake-up reason corresponding to the wake-up event, a target communication node configured to be woken up by the wake-up reason, and an operation power configured to be supplied to the target communication node; and transmitting the wake-up signal.

The wake-up signal may be a physical (PHY) layer signal generated by a PHY layer unit of the communication node.

The wake-up table may further store a minimum power to be supplied to the target communication node.

The wake-up table may be stored in a memory of a PHY layer unit of the communication node.

The operation method may further comprise, after the detecting a wake-up event, operating, by a controller unit of the communication node, in an ON state based on the wake-up event; waking up, by the controller unit, a physical (PHY) layer unit of the communication unit; and transmitting, by the controller unit, information on the wake-up event to the PHY layer unit, wherein the wake-up signal is generated and transmitted by the PHY layer unit of the communication node.

In accordance with embodiments of the present invention, a communication node in a vehicle network may include a PHY layer unit and a controller unit. Also, the PHY layer unit and the controller unit may be configured to: detect, by the controller unit, a wake-up event; generate, by the PHY layer unit, a wake-up signal including an identifier indicating a wake-up reason corresponding to the wake-up event based on a wake-up table, the wake-up table configured for storing the wake-up reason corresponding to the wake-up event, a target communication node configured to be woken up by the wake-up reason, and an operation power configured to be supplied to the target communication node; and transmit, by the PHY layer unit, the wake-up signal.

The wake-up signal may be a PHY layer signal generated by the PHY layer unit of the communication node.

The wake-up table may further store a minimum power to be supplied to the target communication node.

The wake-up table may be stored in a memory of the PHY layer unit of the communication node.

The PHY layer unit and the controller unit may be further configured to: after the detecting of the wake-up event, operate, by the controller unit, in an ON state based on the wake-up event; wake up, by the controller unit, the PHY layer unit of the communication node; and transmit, by the controller unit, information on the wake-up event to the PHY layer unit, wherein the wake-up signal is generated and transmitted by the PHY layer unit.

In accordance with embodiments of the present invention, an operation method of a switch in a vehicle network may include receiving a wake-up signal including an identifier indicating a wake-up reason; identifying a target end node to be woken up by the wake-up reason according to a wake-up table, the wake-up table configured for storing a wake-up event corresponding to the wake-up reason, the target end node to be woken up by the wake-up reason, and an operation power configured to be supplied to the target end node; and transmitting the wake-up signal through a port to which the identified target end node is connected.

The wake-up signal may be a physical (PHY) layer signal.

The wake-up table may further store a minimum power to be supplied to the target end node.

The operation method may further include supplying the operation power for the identified target end node according to the wake-up table through the port to which the identified target end node is connected.

The wake-up table may be stored in a memory of a PHY layer unit of the switch.

The switch may further include a power sourcing equipment (PSE), the switch may be connected to end nodes through data lines, and the wake-up signal and the operation power may be transmitted to the end nodes through the data lines.

The operation method may further include waking up a controller unit of the switch by a PHY layer unit of the switch receiving the wake-up signal.

The waking up may be performed through a management data input/output (MDIO) interface or a media independent interface (xMII) formed between the PHY layer unit and the controller unit.

In accordance with embodiments of the present invention, an operation method of a first communication node including a physical (PHY) layer unit and a controller unit in a vehicle network may include receiving a wake-up signal including an identifier indicating a wake-up reason from a second communication node; receiving an operation power from the second communication node; identifying at least one target communication node configured to be woken up by the wake-up reason according to a wake-up table, the wake-up table configured for storing the wake-up reason corresponding to the wake-up event, the at least one target communication node configured to be woken up by the wake-up reason, and a power to be supplied by the first communication node; and in a response to determining that the first communication node belongs to the at least one target communication node, waking up the controller unit by the PHY layer unit, and transmitting the wake-up signal through a port to which another target communication node is connected.

The operation method may further include supplying the power according to the wake-up table through the port to which the another target communication node is connected.

The wake-up signal may be a physical (PHY) layer signal.

The wake-up table may further store a minimum power to be supplied to the at least one target end node.

The wake-up table may be stored in a memory of a PHY layer unit of the first communication node.

The first communication node may include a PD and a PSE, the first communication node may be connected to communication nodes through data lines, and the wake-up signal and the operation power may be transmitted to the communication nodes through the data lines.

The waking up may be performed through a management data input/output (MDIO) interface or a media independent interface (xMII) formed between the PHY layer unit and the controller unit.

According to the exemplary embodiments of the present invention, when a wake-up event (e.g., a driver's door opening, an assistant driver's door opening, a rear-door opening, an engine start, etc.) occurs, a first communication node that detects the wake-up event may be woken up, and may transmit to a second communication node a wake-up signal including an identifier indicating a wake-up reason based on a wake-up table storing wake-up events, wake-up reasons for the respective wake-up events, a target communication node configured to be woken up by each wake-up reason, and a power to be supplied to each target communication node. Here, the wake-up signal may be a physical (PHY) layer signal.

Upon receiving the wake-up signal, a PHY layer unit of the second communication node may be woken up, and based on the wake-up table, it may identify a target communication node configured to be woken up and a power to be supplied to the target communication node according to the wake-up reason indicated by the identifier included in the received wake-up signal. When the second communication node is not the target communication node, the PHY layer unit of the second communication node may not wake up a controller unit of the second communication node. Also, based on the wake-up table, the second communication node may transmit a wake-up signal and supply a power to a communication node to be woken up based on the wake-up table.

A PHY layer unit of a third communication node receiving the wake-up signal may be woken up, and may identify the wake-up reason indicated by the wake-up signal. The PHY layer unit of the third communication node may wake up a controller unit of the third communication node. Also, the third communication node (i.e., a PD of the third communication node) may be supplied the power from the second communication node (i.e., a PSE of the second communication node).

That is, a wake-up procedure may be simplified since the procedure of exchanging information between the PD and the PSE may be omitted in the wake-up procedure. Furthermore, by configuring the wake-up signal as a PHY signal, the controller unit of the communication node that does not need to operate according to the wake-up event may be prevented from waking up, reducing power consumption. Accordingly, the performance of the vehicle network may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

BRIEF DESCRIPTION OF DRAWINGS

FIG. 8 is a sequence chart illustrating various exemplary embodiments of an operation method of a communication node in the vehicle network of FIG. 5.

Figure 1:
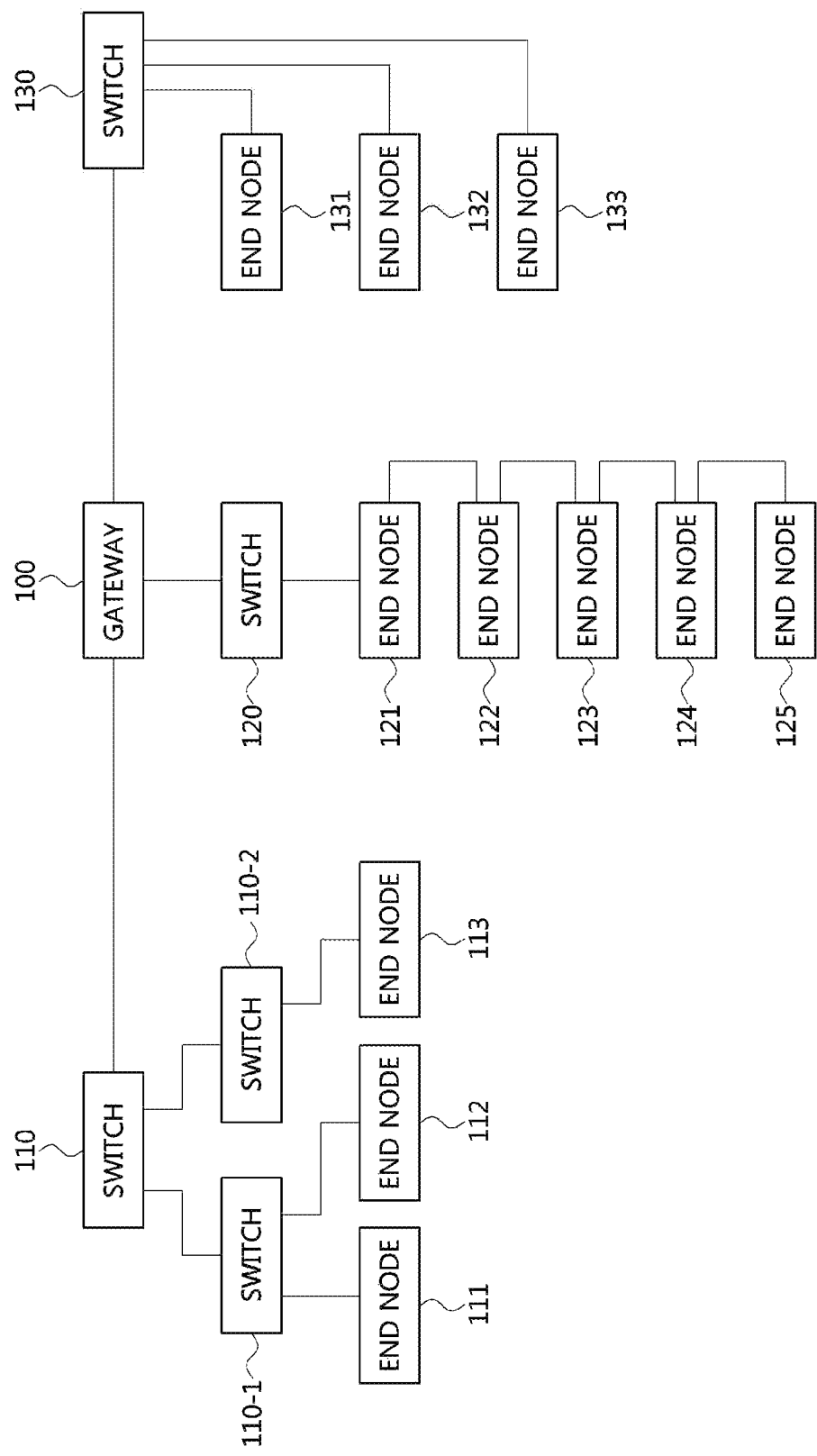
FIG. 1 is a block diagram illustrating various exemplary embodiments of a vehicle network topology.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terminology used herein is for describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in the present specification, specify the presence of stated features, integers, steps, operations, elements, and/or components, but do not preclude the presence or addition of one or more other features, integers, steps, operations, elements, components, and/or groups thereof. As used herein, the term "and/or" may include any and all combinations of one or more of the associated listed items.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and may include hybrid vehicles, electric vehicles, combustion, plug-in hybrid electric vehicles, hydrogen-powered vehicles and other alternative fuel vehicles (e.g., fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that may include a memory and a processor. The memory is configured to store the modules, and the processor is configured to execute the modules to perform one or more processes which are described further below. Moreover, it is understood that the units or modules described herein may embody a controller/control unit of controlling operation of the unit or module.

Furthermore, control logic of the present invention may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present invention may be variously modified and have several forms, specific embodiments will be shown in the accompanying drawings and be described in detail in the detailed description. It should be understood, however, that it is not intended to limit the present invention to the specific embodiments but, On the other hand, the present invention is to cover all modifications and alternatives falling within the spirit and scope of the present invention.

Relational terms such as first, second, and the like may be used for describing various elements, but the elements should not be limited by the terms. These terms are only used to distinguish one element from another. For example, a first component may be named a second component without being departed from the scope of the present invention and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which the present disclosure belongs. Terms such as terms that are generally used and have been in dictionaries should be construed as having meanings matched with contextual meanings in the art. In the present description, unless defined clearly, terms are not ideally, excessively construed as formal meanings.

Hereinafter, forms of the present invention will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating various exemplary embodiments of a vehicle network topology.

As shown in FIG. 1, a communication node forming a vehicle network may be a gateway, a switch (or bridge), or an end node. The gateway 100 may be connected to at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 124, 125, 131, 132, and 133. Each of the switches 110, 110-1, 110-2, 120, and 130 may interconnect the end nodes 111, 112, 113, 121, 122, 123, 124, 125, 131, 132, and 133, and control at least one of the end nodes 111, 112, 113, 121, 122, 123, 124, 125, 131, 132, and 133 connected to the switch.

Each of the end nodes 111, 112, 113, 121, 122, 123, 124, 125, 131, 132, and 133 may include an electronic control unit (ECU) configured to control various types of devices mounted within a vehicle. For example, each of the end nodes 111, 112, 113, 121, 122, 123, 124, 125, 131, 132, and 133 may include an ECU included in an infotainment device (e.g., a display device, a navigation device, and an around view monitoring device).

Meanwhile, the communication nodes (i.e., gateways, switches, end nodes, etc.) forming the vehicle network may be connected in a star topology, a bus topology, a ring topology, a tree topology, a mesh topology, a daisy chain topology, or the like. Furthermore, each of the communication nodes forming the vehicle network may support the CAN protocol, the FlexRay protocol, the MOST protocol, the LIN protocol, the Ethernet protocol, or the like. Embodiments according to an exemplary embodiment of the present invention may be applied to the network topology described above, and the network topology to which the exemplary embodiments according to an exemplary embodiment of the present invention are applied is not limited thereto, and may be variously configured.

Figure 2:
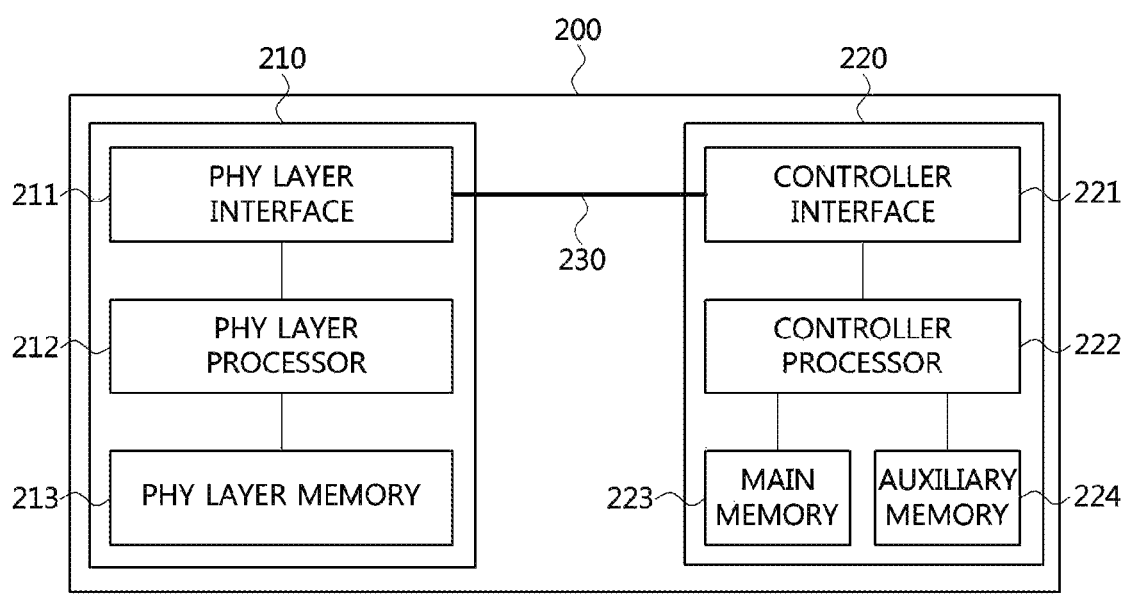
FIG. 2 is a block diagram illustrating various exemplary embodiments of a communication node belonging to a vehicle network.

FIG. 2 is a block diagram illustrating various exemplary embodiments of a communication node belonging to a vehicle network.

As shown in FIG. 2, a communication node 200 forming a vehicle network may include a physical (PHY) layer unit 210 and a controller unit 220. The communication node 200 may further include a regulator for supplying power. The controller 220 may be implemented to include a medium access control (MAC) layer. The PHY layer 210 may be configured to receive or transmit signals from or to another communication node. The controller 220 may be configured to control the PHY layer unit 210 and perform various functions (e.g., an infotainment function, or the like.). The PHY layer unit 210 and the controller unit 220 may be implemented as one system on chip (SoC), or alternatively may be implemented as separate chips.

The PHY layer unit 210 and the controller unit 220 may be connected via a media independent interface (MII) 230. The MII 230 may include an interface defined in the IEEE 802.3 and may include a data interface and a management interface between the PHY layer unit 210 and the controller unit 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer unit 210 may include a PHY layer interface 211, a PHY layer processor 212, and a PHY layer memory 213. The configuration of the PHY layer unit 210 is not limited thereto, and the PHY layer unit 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller unit 220 may be configured to monitor and control the PHY layer unit 210 using the MII 230. The controller unit 220 may include a controller interface 221, a controller processor 222, a main memory 223, and an auxiliary memory 224. The controller processor 222 is an electric circuitry which performs various functions described below. The configuration of the controller unit 220 is not limited thereto, and the controller 220 may be configured in various ways. The controller interface 221 may be configured to receive a signal from the PHY layer unit 210 (e.g., the PHY layer interface 211) or an upper layer, transmit the received signal to the controller processor 222, and transmit the signal received from the controller processor 222 to the PHY layer unit 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Meanwhile, the communication node may basically be in a power-off mode, and may transition from the power-off mode to a sleep mode or an active mode if necessary. The communication node operating in the sleep mode may transition to the power-off mode or the active mode, and the communication node operating in the active mode may transition to the power-off mode or the sleep mode. In the power-off mode, both the PHY layer unit 210 and the controller unit 220 included in the communication node may maintain an OFF state. In the sleep mode, the PHY layer unit 210 included in the communication node may wake up and operate in an ON state, and the controller unit 220 included in the communication node may maintain the OFF state. In the active mode, the PHY layer unit 210 and the controller unit 220 included in the communication node may all wake up and operate in the ON state.

In the following description, methods performed in a communication node and a counterpart communication node corresponding thereto belonging to a vehicle network will be described. Hereinafter, even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node.

The power line for power supply in the vehicle network may be separated from the data line used for communications between electronic devices in the vehicle network. In the instant case, the electronic device may acquire a power through the power line and receive data through the data line. Alternatively, power and data in a vehicle network may be transmitted through a single line. For example, according to the IEEE 802.3bu standard (i.e., PoDL), the power may be transmitted through the data line used for communication. A PoDL-based vehicle network may be as follows.

Figure 3:
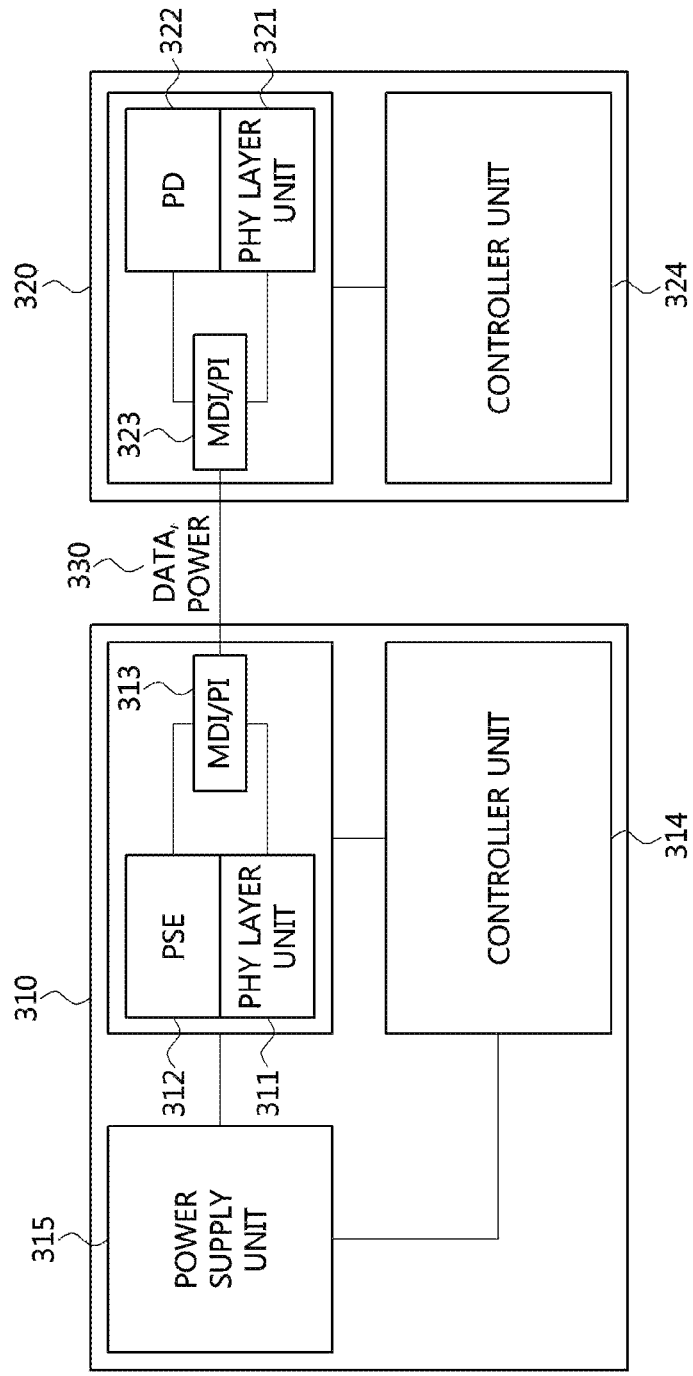
FIG. 3 is a block diagram illustrating various exemplary embodiments of a vehicle network based on PoDL.

FIG. 3 is a block diagram illustrating various exemplary embodiments of a vehicle network based on PoDL.

As shown in FIG. 3, a communication node 310 may be connected to a communication node 320 through a data line 330 (e.g., a link segment). Each of the communication nodes 310 and 320 may be a gateway, a switch (or bridge), or an end node. Each of the communication nodes 310 and 320 may support the IEEE 802.3bu standard. The communications between the communication nodes 310 and 320 may be performed through the data line 330. Also, power may be transferred through the data line 330. For example, the communication node 310 may supply a power through the data line 330, and the communication node 320 may acquire the power through the data line 330.

The communication node 310 may include a PHY layer unit 311, a power sourcing equipment (PSE) 312 and a medium dependent interface/power interface (MDI/PI) 313. The communication node 310 may further include a controller unit 314. The controller unit 314 may be the same as or similar to the controller unit 220 described with reference to FIG. 2. The communication node 310 may further include a power supply unit 315. The power supply unit 315 may supply power to the PHY layer unit 311 and the controller unit 314, and may turn off the power.

The PHY layer unit 311 may be the same as or similar to the PHY layer unit 210 described with reference to FIG. 2. The PSE 312 may be a PSE defined in the IEEE 802.3bu standard. Thus, the PSE 312 may detect a powered device (PD) 322 (or, the communication node 320 including the PD 322), and supply a power to the PD 322 (or, the communication node 320 including the PD 322).

The MDI/PI 313 may be an MDI/PI defined in the IEEE 802.3bu standard. In the MDI/PI 313, the MDI may be an interface between the PHY layer unit 311 and the data line 330. The MDI may support transmission or reception of data through the data line 330. In the MDI/PI 313, the PI may be an interface between the PSE 312 and the data line 330. The PI may support monitoring operations for a state (e.g., voltage, current, etc.) of the data line 330, and may support the power supply operation through the data line 330. The PI may exist separately from the MDI, or it may exist as contained within the MDI.

The communication node 320 may include a PHY layer unit 321, the PD 322, and an MDI/PI 323. The communication node 320 may further include a controller unit 324. The controller unit 324 may be the same as or similar to the controller unit 220 described with reference to FIG. 2.

The PHY layer unit 321 may be the same as or similar to the PHY layer unit 210 described with reference to FIG. 2. The PD 322 may be a PD defined in the IEEE 802.3bu standard. The PD 322 may request the PSE 312 (or, the communication node 310 including the PSE 312) to supply a power to the PD 322, and acquire the power supplied from the PSE 312 (or, the communication node 310 including the PSE 312) in a response to the request for power supply.

The MDI/PI 323 may be an MDI/PI defined in the IEEE 802.3bu standard. In the MDI/PI 323, the MDI may be an interface between the PHY layer unit 321 and the data line 330. The MDI may support transmission or reception of data through the data line 330. In the MDI/PI 323, the PI may be an interface between the PD 322 and the data line 330. The PI may support the power acquisition operation through the data line 330. The PI may exist separately from the MDI, or it may exist as contained within the MDI.

The communication node 310 may operate based on the power generated by the power supply unit 315 and may supply the power to other communication nodes. However, since the communication node 310 does not include a PD, the communication node 310 is not configured for acquiring a power from another communication node. On the other hand, the communication node 320 may acquire the power from the communication node 310, and may operate based on the acquired power. However, since the communication node 320 does not include a power supply unit, the communication node 320 cannot generate a necessary power. Also, since the communication node 320 does not include a PSE, the communication node 320 is not configured for supplying a power to other communication nodes. A communication node including both the PSE and the PD may be as follows.

Figure 4:
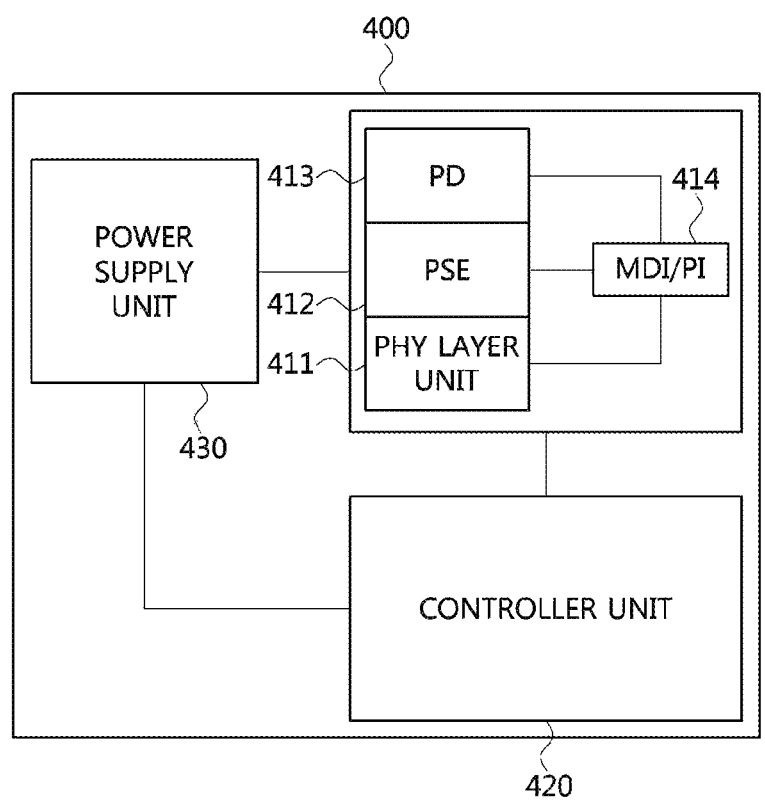
FIG. 4 is a block diagram illustrating various exemplary embodiments of a vehicle network based on PoDL.

FIG. 4 is a block diagram illustrating various exemplary embodiments of a vehicle network based on PoDL.

As shown in FIG. 4, a communication node 400 may include a PHY layer unit 411, a PSE 412, a PD 413, an MDI/PI 414, a controller unit 420, and a power supply unit 430. The controller unit 420 may be the same as or similar to the controller unit 220 described with reference to FIG. 2. The communication node 400 may be a gateway, a switch (or bridge), an end node, or the like. The PHY layer unit 411 may be the same as or similar to the PHY layer unit 210 described with reference to FIG. 2. The power supply unit 430 may be the same as or similar to the power supply unit 315 described with reference to FIG. 3.

The PSE 412 may be a PSE defined in the IEEE 802.3bu standard. Thus, the PSE 412 may detect a PD (or, another communication node including the PD) and supply a power to the detected PD (or, another communication node including the detected PD). The PD 413 may be a PD defined in the IEEE 802.3bu standard. The PD 413 may request a PSE (or, another communication node including the PSE) to supply a power to the PD 413, and acquire the power supplied from the PSE (or, another communication node including the PSE) in a response to the request for power supply.

The MDI/PI 414 may be an MDI/PI defined in the IEEE802.3bu standard. In the MDI/PI 414, the MDI may be an interface between the PHY layer unit 411 and the data line (not shown in FIG. 4). The MDI may support transmission or reception of data through the data line. In the MDI/PI 414, the PI may be an interface between the PSE 412 and the data line or an interface between the PD 413 and the data line. The PI may support the power supply operation or the power acquisition operation through the data line. The PI may exist separately from the MDI, or it may exist as contained within the MDI.

The communication node 400 may have two operation modes. The two operation modes may include a PSE mode and a PD mode. The default operation mode may be the PSE mode. In the PSE mode, the communication node 400 may operate based on the PSE 412 which is activated and the PD 413 which is inactivated. Thus, the communication node 400 may operate based on a power generated by the power supply unit 430, and may supply the power to other communication nodes through the activated PSE 420. In the PD mode, the communication node 400 may operate based on the PSE 412 which is inactivated and the PD 413 which is activated. Thus, the communication node 400 may acquire a power (or, redundancy power) from another communication node through the PD 413, and may operate based on the acquired power. The PSE 412 and the PD 413 may be activated or deactivated under the control of the PHY layer unit 411 (or, the controller unit 420). The specific operations of the communication node 400 in the PSE mode will be referred to as follows.

A first communication node (e.g., the communication node 400) may operate in the PSE mode, which is the default operation mode. The first communication node (or, the PSE included in the first communication node) may identify presence of a PD or a second communication node including the PD by monitoring data line connected to the second communication node including the PD. Here, the second communication node may be the communication node 320 or the communication node 400 operating in the PD mode described with reference to FIG. 3. For example, the first communication node may determine that the PD (or, the second communication node including the PD) exists when a voltage within a preconfigured range (e.g., 2.8 volts to 3.2 volts) is detected in the data line. In the instant case, the first communication node may determine that power supply is requested from the second communication node. On the other hand, when the first communication node detects a voltage outside the preconfigured range (e.g., a voltage lower than 2.8 volts or a voltage higher than 3.2 volts) in the data line, the first communication node may determine that the PD (or, the second communication node including the PD) does not exist.

When the second communication node including the PD is detected (i.e., when the power supply is requested from the second communication node), the first communication node may identify the type and the class power requirement of the PD included in the second communication node. The type of the PD may be classified into an 'A' type supporting 100 BASE-T1 Ethernet, a 'B' type supporting 1000 BASE-T1 Ethernet, and an 'A+B' type supporting both 100 BASE-T1 Ethernet and 1000 BASE-T1 Ethernet. However, the type of the PD is not limited to the above examples, and the type of the PD may be variously defined. For example, a type supporting 10 GBASE Ethernet, or a type supporting 100 GBASE Ethernet may be further defined. The class power requirements of the PD may be defined as shown in Table 1 and Table 2 below.

TABLE 1

| | Class Power Requirements | | | | | |
|---|---|---|---|---|---|---|
| | 12 V unregulated | | 12 V regulated | | 24 V unregulated | |
| | (a) | (b) | (a) | (b) | (a) | (b) |
| $V_{PSE(max)}$ (V) | 18 | 18 | 18 | 18 | 36 | 36 |
| $V_{PSE(min)}$ (V) | 5.60 | 5.77 | 14.4 | 14.4 | 11.7 | 11.7 |
| $I_{PI(max)}$ (A) | 0.109 | 0.267 | 0.249 | 0.471 | 0.097 | 0.339 |
| $V_{PD(min)}$ (V) | 4.61 | 3.75 | 12.0 | 10.6 | 10.3 | 8.86 |
| $P_{PD}$ (W) | 0.5 | 1 | 3 | 5 | 1 | 3 |
| SCCP Class code | 0 | 1 | 2 | 3 | 4 | 5 |

TABLE 2

| | Class Power Requirements | | | | | |
|---|---|---|---|---|---|---|
| | 24 V regulated | | 48 V unregulated | | 48 V regulated | |
| | (a) | (b) | (a) | (b) | (a) | (b) |
| $V_{PSE(max)}$ (V) | 36 | 36 | 60 | 60 | 60 | 60 |
| $V_{PSE(min)}$ (V) | 26.0 | 26.0 | 23.1 | 23.6 | 48.0 | 48.0 |
| $I_{PI(max)}$ (A) | 0.215 | 0.461 | 0.248 | 0.532 | 0.735 | 1.36 |
| $V_{PD(min)}$ (V) | 23.3 | 21.7 | 20.2 | 18.8 | 40.8 | 36.7 |
| $P_{PD}$ (W) | 5 | 10 | 5 | 10 | 30 | 50 |
| SCCP Class code | 6 | 7 | 8 | 9 | 10 | 11 |

The $V_{PSE(max)}$ may be the maximum voltage measured at the PI of the first communication node. The $V_{PSE(min)}$ may be the minimum voltage measured at the PI of the first communication node. The $I_{PI(max)}$ may be the maximum current measured at the PI of the first communication node. The $V_{PD(min)}$ may be the minimum voltage measured at the PI of the second communication node including the PD. The $P_{PD}$ may be the power available at the PI of the second communication node including the PD. The serial communication classification protocol (SCCP) class code may be the class code defined in the SCCP.

The first communication node (e.g., the PSE and the PHY layer unit included in the first communication node) may transmit, to the second communication node, a signal requesting information related to the type and the class power requirement of the PD included in the second communication node. As such, the second communication node (e.g., the PD and the PHY layer unit included in second communication node) may receive the signal from the first communication node, generate a signal including the requested information in a response to the received signal, and transmit the generated signal to the first communication node. The signal may be transmitted through the data line between the first communication node and the second communication node.

The first communication node (e.g., the PSE and the PHY layer unit included in the first communication node) may receive, from the second communication node, the signal including information related to the type, the class power requirement, etc. of the PD included in the second communication node. The first communication node (e.g., the PSE and the PHY layer unit included in the first communication node) may identify the type and the class power requirement of the PD included in the second communication node based on the received signal. Also, the first communication node (i.e., the PHY layer unit and the controller unit included in the first communication node) may identify the identifier of the second communication node from the received signal.

The first communication node (e.g., the PSE included in the first communication node) may determine a power to be supplied to the second communication node based on the identified type and class power requirement of the PD, and supply the determined power to the second communication node through the data line. The second communication node (e.g., the PD included in the second communication node) may acquire the power from the first communication node through the data line, and may operate based on the acquired power.

Meanwhile, the second communication node may not need to acquire the power from the first communication node when it can acquire power from another entity (e.g., the power supply unit included in the second communication node). In the instant case, the second communication node (e.g., the PD included in the second communication node) may generate a signal including an indicator instructing to stop the power supply, and transmit the generated signal to the first communication node through the data line. The indicator may be represented by 1 bit. For example, if the indicator is set to 0, it may instruct to supply power, and if the identifier is set to 1, it may instruct to stop power supply. Furthermore, the signal may also include the identifier of the second communication node. The first communication node (e.g., the PSE included in the first communication node) may receive the signal from the second communication node through the data line, and stop the power supply to the second communication node when the received signal instructs to stop the power supply.

Figure 5:
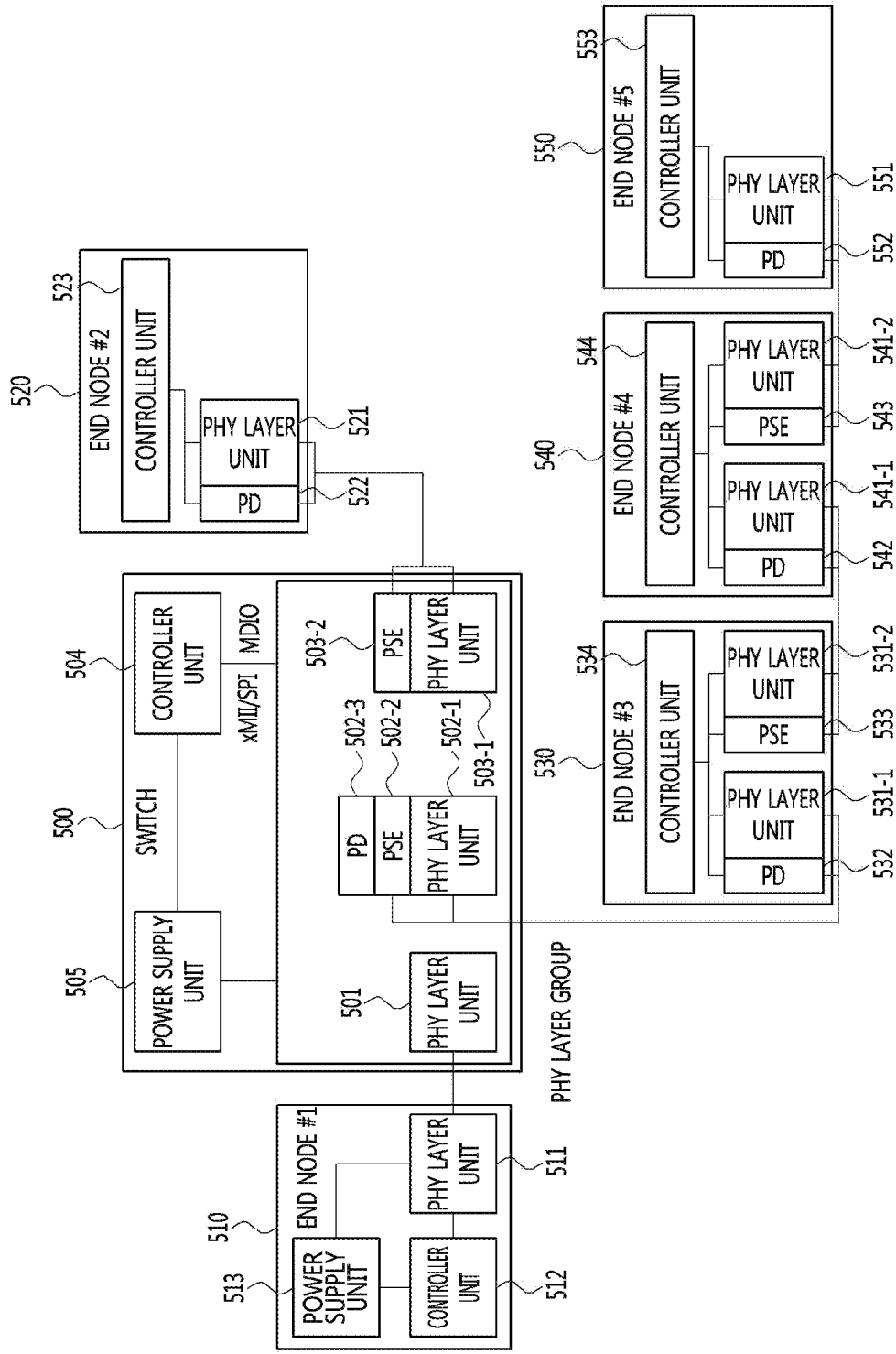
FIG. 5 is a block diagram illustrating various exemplary embodiments of a vehicle network based on PoDL.

FIG. 5 is a block diagram illustrating various exemplary embodiments of a vehicle network based on PoDL.

As shown in FIG. 5, a vehicle network may include a switch 500, a first end node 510, a second end node 520, a third end node 530, a fourth end node 540, and a fifth end node 550. The switch 500 may be connected to the second end node 520 and the third end node 530 through a data line (e.g., a link segment). The third end node 530 may be connected to the fourth end node 540 through a data line, and the fourth end node 540 may be connected to the fifth end node 550 through a data line. The end nodes 510, 520, 530, 540, and 550 may support the IEEE 802.3bu standard. Communications between the switch 500 and the end nodes 520 and 530 may be performed through the data line. The switch 500 may supply power to the end nodes 520 and 530 through the data lines, and the end nodes 520 and 530 may acquire the power from the switch 500 through the data lines. Communications between the end node 530 and the end node 540 may be performed through the data line. The end node 530 may supply a power to the end node 540 through the data line, and the end node 540 may acquire the power from the end node 530 through the data line. Communications between the end node 540 and the end node 550 may be performed through the data line. The end node 540 may supply a power to the end node 550 through the data line, and the end node 550 may acquire the power from the end node 540 through the data line.

The switch 500 may include PHY layer units 501, 502-1, and 503-1, PSEs 502-2 and 503-2, a PD 502-3, a controller unit 504, a power supply unit 505, and the like. The PHY layer units 501, 502-1 and 503-1, the PSEs 502-2 and 503-2, and the PD 502-3 of the switch 500 may be included in a PHY layer group.

Each of the PHY layer units 501, 502-1, and 503-1 of the switch 500 may be the same as or similar to the PHY layer unit 210 described with reference to FIG. 2. The PHY layer unit 501 of the switch 500 may be connected to a PHY layer unit 511 of the end node 510, the PHY layer unit 502-1 of the switch 500 may be connected to a PHY layer unit 531-1 of the end node 530, and the PHY layer unit 503-1 of the switch 500 may be connected to a PHY layer unit 521 of the end node 520. Each of the PSEs 502-2 and 503-2 of the switch 500 may be a PSE defined in the IEEE 802.3bu standard. Thus, the PSE 502-2 of the switch 500 may detect a PD 532 of the end node 530 (or, the end node 530 including the PD 532), and supply a power to the detected PD 532 of the end node 530 (or, the end node 530 including the PD 532). The PSE 503-2 of the switch 500 may detect a PD 522 of the end node 520 (or, the end node 520 including the PD 522), and supply a power to the detected PD 522 of the end node 520 (or, the end node 520 including the PD 522). The PD 502-3 of the switch 500 may be a PD defined in the IEEE 802.3bu standard. The controller unit 504 of the switch 500 may be the same as or similar to the controller unit 220 described with reference to FIG. 2. The power supply unit 505 of the switch 500 may be the same as or similar to the power supply unit 315 described with reference to FIG. 3.

The end node 510 may include the PHY layer unit 511, a controller unit 512, a power supply unit 513, and the like. The PHY layer unit 511 of the end node 510 may be the same as or similar to the PHY layer unit 210 described with reference to FIG. 2. The controller unit 512 of the end node 510 may be the same as or similar to the controller unit 220 described with reference to FIG. 2. The power supply unit 513 of the end node 510 may be the same as or similar to the power supply unit 315 described with reference to FIG. 3.

The end node 520 may include the PHY layer unit 521, the PD 522, a controller unit 523, and the like. The PHY layer unit 521 of the end node 520 may be the same as or similar to the PHY layer unit 210 described with reference to FIG. 2. The PD 522 of the end node 520 may be a PD defined in the IEEE 802.3bu standard. Thus, the PD 522 of the end node 520 may request power supply to the PSE 503-2 of the switch 500 (or, the switch 500 including the PSE 503-2), and may acquire a power from the PSE 503-2 of the switch 500 (or, the switch 500 including the PSE 503-2) in a response to the request for power supply. The controller unit 523 of the end node 520 may be the same as or similar to the controller unit 220 described with reference to FIG. 2.

The end node 530 may include PHY layer units 531-1 and 531-2, the PD 532, a PSE 533, a controller unit 534, and the like. The PHY layer units 531-1 and 531-2 of the end node 530 may be the same as or similar to the PHY layer unit 210 described with reference to FIG. 2. The PHY layer unit 531-1 of the end node 530 may be connected to the PHY layer unit 502-1 of the switch 500, and the PHY layer unit 531-2 of the end node 530 may be connected to a PHY layer unit 541-1 of the end node 540. The PD 532 of the end node 530 may be a PD defined in the IEEE 802.3bu standard. Thus, the PD 532 of the end node 530 may request power supply to the PSE 502-2 of the switch 500 (or, the switch 500 including the PSE 502-2), and may acquire a power from the PSE 502-2 of the switch 500 (or, the switch 500 including the PSE 502-2) in a response to the request for power supply. The PSE 533 of the end node 530 may be a PSE defined in the IEEE 802.3bu standard. Thus, the PSE 533 of the end node 530 may detect a PD 542 of the end node 540 (or, the end node 540 including the PD 542), and supply a power to the detected PD 542 of the end node 540 (or, the end node 540 including the PD 542). The controller unit 534 of the end node 530 may be the same as or similar to the controller unit 220 described with reference to FIG. 2.

The end node 540 may include PHY layer units 541-1 and 541-2, the PD 542, a PSE 543, a controller unit 544, and the like. The PHY layer units 541-1 and 541-2 of the end node 540 may be the same as or similar to the PHY layer unit 210 described with reference to FIG. 2. The PHY layer unit 541-1 of the end node 540 may be connected to the PHY layer unit 531-2 of the end node 530, and the PHY layer unit 541-2 of the end node 540 may be connected to a PHY layer unit 551 of the end node 550. The PD 542 of the end node 540 may be a PD defined in the IEEE 802.3bu standard. Thus, the PD 542 of the end node 540 may request power supply to the PSE 533 of the end node 530 (or, the end node 530 including the PSE 533), and may acquire a power from the PSE 533 of the end node 530 (or, the end node 530 including the PSE 533) in a response to the request for power supply. The PSE 543 of the end node 540 may be a PSE defined in the IEEE 802.3bu standard. Thus, the PSE 543 of the end node 540 may detect a PD 552 of the end node 550 (or, the end node 550 including the PD 552), and supply a power to the detected PD 552 of the end node 550 (or, the end node 550 including the PD 552). The controller unit 544 of the end node 540 may be the same as or similar to the controller unit 220 described with reference to FIG. 2.

The end node 550 may include the PHY layer unit 551, the PD 552, a controller unit 553, and the like. The PHY layer unit 551 of the end node 550 may be the same as or similar to the PHY layer unit 210 described with reference to FIG. 2. The PHY layer unit 551 of the end node 550 may be connected to the PHY layer unit 541-2 of the end node 540. The PD 552 of the end node 550 may be a PD defined in the IEEE 802.3bu standard. Thus, the PD 552 of the end node 550 may request power supply to the PSE 543 of the end node 540 (or, the end node 540 including the PSE 543), and may acquire a power from the PSE 543 of the end node 540 (or, the end node 540 including the PSE 543) in a response to the request for power supply. The controller unit 553 of the end node 550 may be the same as or similar to the controller unit 220 described with reference to FIG. 2.

The above-described communication node may basically be in the power-off mode, and may transition from the power-off mode to the sleep mode or the active mode if necessary. The communication node operating in the sleep mode may transition to the power-off mode or the active mode, and the communication node operating in the active mode may transition to the power-off mode or the sleep mode. In the power-off mode, both the PHY layer unit (i.e., the PHY layer unit 210 described with reference to FIG. 2) and the controller unit (i.e., the controller unit 220 described with reference to FIG. 2) included in the communication node may maintain the OFF state. In the sleep mode, the PHY layer unit included in the communication node may wake up and operate in the ON state, and the controller unit included in the communication node may maintain the OFF state. In the active mode, the PHY layer unit and the controller unit included in the communication node may all wake up and operate in the ON state.

In the following description, wake-up methods in a vehicle network will be described. Hereinafter, even when a method (e.g., transmission or reception of a signal) to be performed at a first communication node is described, a corresponding second communication node may perform a method (e.g., reception or transmission of the signal) corresponding to the method performed at the first communication node. That is, when an operation of the first communication node is described, the corresponding second communication node may perform an operation corresponding to the operation of the first communication node. Conversely, when an operation of the second communication node is described, the corresponding first communication node may perform an operation corresponding to the operation of the second communication node. Next, a procedure in which a wake-up event occurs, and a communication node corresponding to the wake-up event wakes up will be described.

Figure 6:
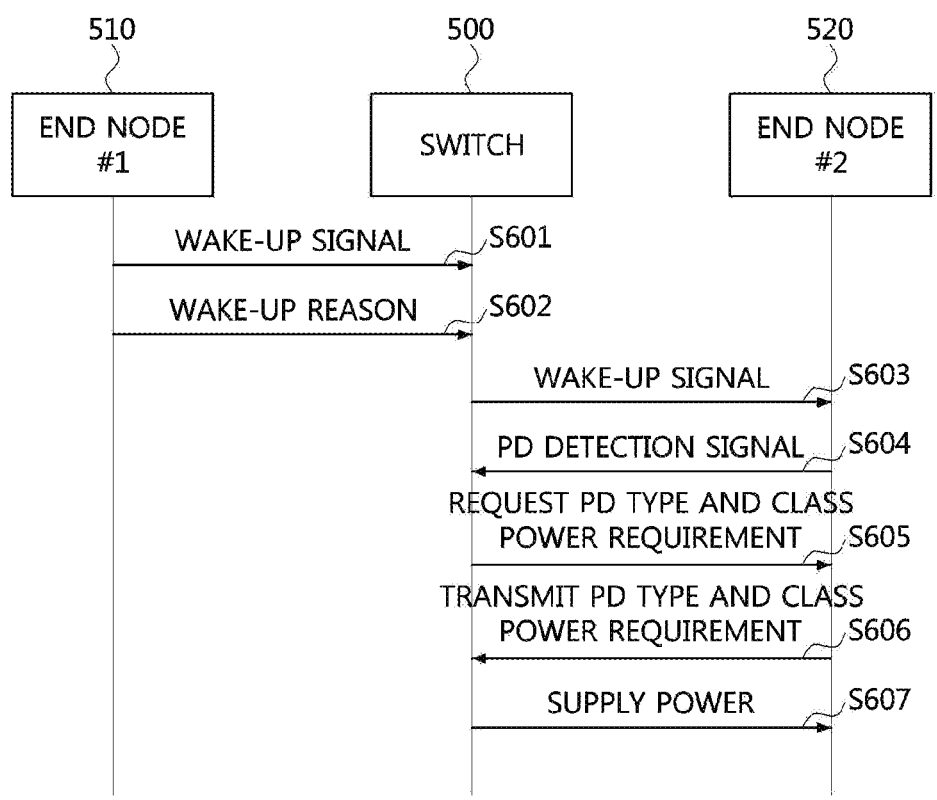
FIG. 6 is a sequence chart illustrating various exemplary embodiments of an operation method of a communication node in the vehicle network of FIG. 5.

FIG. 6 is a sequence chart illustrating various exemplary embodiments of an operation method of a communication node in the vehicle network of FIG. 5.

As shown in FIG. 5 and FIG. 6, a vehicle network of FIG. 6 may be the same as or similar to the vehicle network of FIG. 5. An end node 510 of FIG. 6 may be the end node 510 of FIG. 5, an end node 520 of FIG. 6 may be the end node 520 of FIG. 5, and a switch 500 of FIG. 6 may be the switch 500 of FIG. 5.

When a wake-up event occurs, the controller unit 512 of the end node 510 may be woken up by the wake-up event, and may identify a wake-up reason in accordance with the wake-up event. When it is determined to be necessary to wake up another end node after identifying the wake-up reason, the controller unit 512 of the end node 510 may wake up the PHY layer unit 511 of the end node 510. The PHY layer unit 511 of the end node 510 may be woken up, and may generate a wake-up signal. The PHY layer unit 511 of the end node 510 may transmit the wake-up signal to the PHY layer unit 501 of the switch 500 (S601). The controller unit 512 of the end node 510 may generate a signal indicating the wake-up reason (hereinafter, a 'wake-up reason signal'), and transmit the wake-up reason signal to the PHY layer unit 511 of the end node 510. The PHY layer unit 511 of the end node 510 may receive the wake-up reason signal, and transmit the wake-up reason signal to the PHY layer unit 501 of the switch 500 (S602).

The PHY layer unit 501 of the switch 500 may receive the wake-up signal. Upon receiving the wake-up signal, the PHY layer unit 501 of the switch 500 may transmit the wake-up signal to the controller unit 504 of the switch 500. The controller unit 504 of the switch 500 may receive the wake-up signal, and the controller unit 504 of the switch 500 may be woken up. The PHY layer unit 501 of the switch 500 may receive the wake-up reason signal from the PHY layer unit 511 of the end node 510, and transmit the wake-up reason signal to the controller unit 504 of the switch 500. The controller unit 504 of the switch 500 may receive the wake-up reason signal. Upon receiving the wake-up reason signal, the controller unit 504 of the switch 500 may determine an end node (e.g., the end node 520) to be woken up according to the wake-up reason. The PHY layer unit 503-1 of the switch 500 may transmit a wake-up signal to the PHY layer unit 521 of the end node 520 (S603), and then transmit a wake-up reason signal to the PHY layer unit 521 of the end node 520.

The PHY layer unit 521 of the end node 520 may receive the wake-up signal. Upon receiving the wake-up signal, the PHY layer unit 521 of the end node 520 may transmit the wake-up signal to the controller unit 523 of the end node 520. The controller unit 523 of the end node 520 may receive the wake-up signal, and may be woken up. The PHY layer unit 521 of the end node 520 may receive the wake-up reason signal. Upon receiving the wake-up reason signal, the PHY layer unit 521 of the end node 520 may transmit the wake-up reason signal to the controller unit 523 of the end node 520. The controller unit 523 of the end node 520 may receive the wake-up reason signal and may identify the wake-up reason. The controller unit 523 of the end node 520 may request the PD 522 of the end node 520 to supply a power when an operation of the end node 520 is required according to the wake-up reason. In a response to the request for power supply, the PD 522 of the end node 520 may transmit a PD detection signal to the PSE 503-2 of the switch 500 (S604).

The PSE 503-2 of the switch 500 may identify the presence of the PD 522 of the end node 520 by monitoring the data line connected to the PD 522 of the end node 520. When a voltage within a preconfigured range (e.g., 2.8 volts to 3.2 volts) is detected in the data line, the PSE 503-2 of the switch 500 may determine that the PD 522 of the end node 520 is present. In the present case, the PSE 503-2 of the switch 500 may determine that power supply is requested from the PD 522 of the end node 520. On the other hand, when a voltage outside the preconfigured range (e.g., a voltage lower than 2.8 volts or a voltage higher than 3.2 volts) is detected in the data line, the PSE 503-2 of the switch 500 may determine that the PD 522 of the end node 520 is not present.

When the PD 522 of the end node 520 is detected, the PSE 503-2 of the switch 500 may transmit to the PD 522 of the end node 520 a signal requesting information related to the type and class power requirement of the PD 522 of the end node 520 (S605). Upon receiving the signal from the PSE 503-2 of the switch 500, the PD 522 of the end node 520 may generate a signal including information related to the type and class power requirement of itself in a response to the received signal, and transmit the generated signal to the PSE 503-2 of the switch 500 (S606). The signal may be transmitted through the data line between the PD 522 of the end node 520 and the PSE 503-2 of the switch 500. The PSE 503-2 of the switch 500 may receive from the PD 522 of the end node 520 the signal including the information related to the type and class power requirement of the PD. The PSE 503-2 of the switch 500 may identify the type and class power requirement of the PD 522 of the end node 520 from the received signal.

The PSE 503-2 of the switch 500 may determine a power to be supplied to the PD 522 of the end node 520 based on the type and class power requirement of the PD, and supply the power to the PD 522 of the end node 520 through the data line (S607). The PD 522 of the end node 520 may acquire the power from the PSE 503-2 of the switch 500 through the data line, and operate based on the acquired power. Next, methods for selectively waking up a communication node without information exchange between PD and PSE based on a wake-up table of end nodes connected in a star topology will be described.

Figure 7:
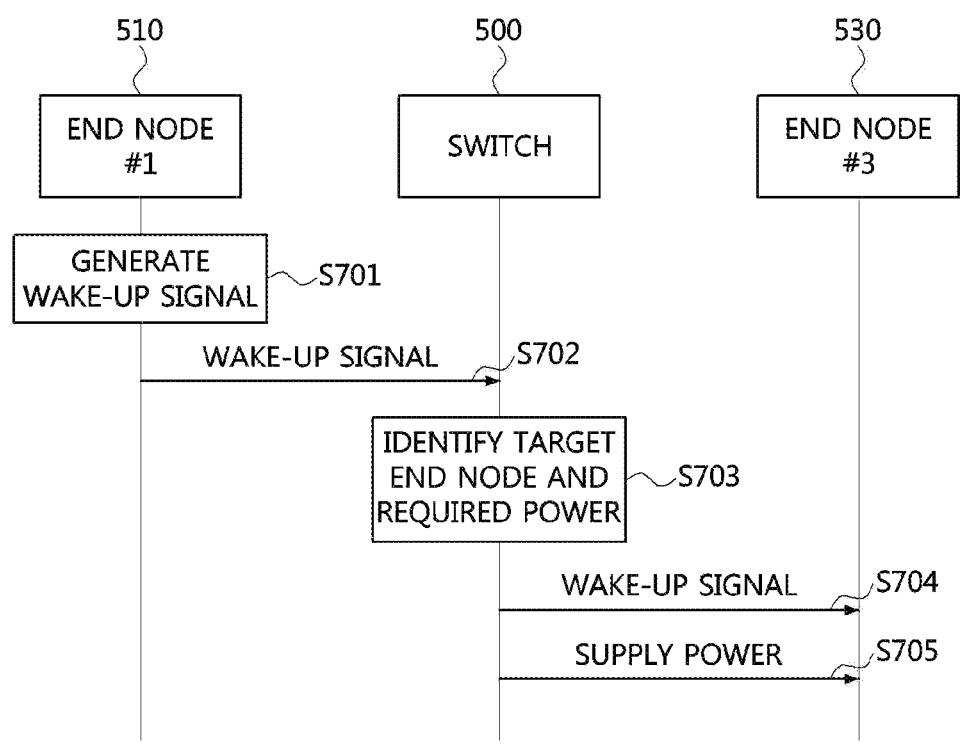
FIG. 7 is a sequence chart illustrating various exemplary embodiments of an operation method of a communication node in the vehicle network of FIG. 5.

FIG. 7 is a sequence chart illustrating various exemplary embodiments of an operation method of a communication node in the vehicle network of FIG. 5.

As shown in FIGS. 5 and 7, a vehicle network of FIG. 7 may be the same as or similar to the vehicle network of FIG.

5. An end node 510 of FIG. 7 may be the end node 510 of FIG. 5, an end node 530 of FIG. 7 may be the end node 530 of FIG. 5, and a switch 500 of FIG. 7 may be the switch 500 of FIG. 5.

When a wake-up event occurs, the controller unit 512 of the end node 510 may be woken up by the wake-up event, and may identify a wake-up reason in accordance with the wake-up event. When it is determined to be necessary to wake up another end node after identifying the wake-up reason, the controller unit 512 of the end node 510 may wake up the PHY layer unit 511 of the end node 510, and transmit an identifier indicating the wake-up event to the PHY layer unit 511 of the end node 510. The PHY layer unit 511 of the end node 510 may be woken up, and generate a wake-up signal. The wake-up signal may be generated based on a wake-up table below (i.e., Table 3 or Table 4).

TABLE 3

| Wake-up event | Wake-up reason | Target end node (number) | Power supply from PSE 503-2 | Power supply from PSE 502-2 | Power supply from PSE 533 | Power supply from PSE 543 |
|---|---|---|---|---|---|---|
| A | REASON1 | 3 | 0 | P3 | 0 | 0 |
| B, C | REASON2 | 2, 4 | P2 | P4 | P4 | 0 |
| D | REASON3 | 5 | 0 | P5 | P5 | P5 |
| E, F | REASON4 | 3, 4 | 0 | P3 + P4 | P4 | 0 |
| G | REASON5 | 3, 5 | 0 | P3 + P5 | P5 | P5 |
| H, I, J | REASON6 | 2, 3, 4, 5 | P2 | P3 + P4 + P5 | P4 + P5 | P5 |
| ... | | | | | | |

TABLE 4

| Wake-up event | Wake-up reason | Target end node (number) | Initial power | Power supply from PSE 503-2 | Power supply from PSE 502-2 | Power supply from PSE 533 | Power supply from PSE 543 |
|---|---|---|---|---|---|---|---|
| A | REASON1 | 3 | P0 | 0 | P3 | 0 | 0 |
| B, C | REASON2 | 2, 4 | P0 | P2 | P4 | P4 | 0 |
| D | REASON3 | 5 | P0 | 0 | P5 | P5 | P5 |
| E, F | REASON4 | 3, 4 | P0 | 0 | P3 + P4 | P4 | 0 |
| G | REASON5 | 3, 5 | P0 | 0 | P3 + P5 | P5 | P5 |
| H, I, J | REASON6 | 2, 3, 4, 5 | P0 | P2 | P3 + P4 + P5 | P4 + P5 | P5 |
| ... | | | | | | | |

Table 3 may be a wake-up table for the end node 520, the end node 530, the end node 540 and the end node 550 connected to the switch 500 as shown in FIG. 5. The wake-up table may store a wake-up reason corresponding to each wake-up event, a target end node to be woken up by each wake-up reason, and an operation power configured to be supplied to the target end node. The operation power supplied between the switch 500 and each of the end nodes 520, 530, 540, and 550 may be as shown in Table 3. For example, when the wake up event A occurs, it may correspond to the wake up reason REASON1. Thus, the third end node 530 (i.e., the end node #3) may be the target end node. When the end node 530 is determined as the target end node, the PSE 502-2 of the switch 500 may supply a power corresponding to P3 (i.e., the operation power of the end node 530) to the PD 532 of the end node 530.

Table 4 may be a wake-up table for the end node 520, the end node 530, the end node 540 and the end node 550 connected to the switch 500 as shown in FIG. 5. As compared with Table 3, Table 4 may further include a minimum power to be supplied to the target end node. For example, when the wake up event A occurs, it may correspond to the wake up reason REASON1. Thus, the third end node 530 (i.e., the end node #3) may be the target end node. When the end node 530 is determined as the target end node, the PSE 502-2 of the switch 500 may supply a power corresponding to (P0+P3) (i.e., a sum of the operation power P3 of the end node 530 and the minimum power P0) to the PD 532 of the end node 530. Meanwhile, even when the power to be supplied by the PSE 503-2 of the switch 500 is denoted as '0' according to Table 4, the PSE 503-2 of the switch 500 may be required to supply the power corresponding to P0 (i.e., the minimum power).

The wake-up event detected by the end node 510 may be 'A' in Table 3. In the present case, the PHY layer unit 511 of the end node 510 may generate a wake-up signal based on the wake-up table, including an identifier indicating the wake-up reason REASON1 corresponding to the wake up event A (S701). The wake-up table may be stored in a memory of PHY layer unit 511 of the end node 510 and the wake-up signal may be a PHY layer signal (e.g., an in-band signal). The PHY layer unit 511 of the end node 510 may transmit the generated wake-up signal to the PHY layer unit 501 of the switch 500 (S702).

The PHY layer unit 501 of the switch 500 may receive the wake-up signal. The PHY layer unit 501 of the switch 500 receiving the wake-up signal may identify the identifier indicating the wake-up reason REASON1 included in the wake-up signal. The PHY layer unit 501 of the switch 500 may identify the target end node (e.g., the end node 530) and the power (e.g., P3) to be supplied to the target end node based on the wake-up table (S703). When a power for the target end node is available, the PHY layer unit 501 of the switch 500 may wake up the controller unit 504 of the switch 500. Since the power to be supplied to the target end node may be immediately identified based on the wake-up table and the wake-up signal, the procedure of exchanging information between PD and PSE may not be performed. The PHY layer unit 501 of the switch 500 may transmit to the controller unit 504 of the switch 500 information on the target end node and the power to be supplied to the target end node. The controller unit 504 of the switch 500 may control the power supply unit of the switch 500 to supply the power (e.g., P3) to the target end node through the PSE 502-2 of the switch 500.

The PHY layer unit 502-1 of the switch 500 may generate a wake-up signal based on the wake-up table, including an identifier indicating the wake-up reason REASON1 corresponding to the wake up event A. The wake-up table may be stored in a memory of PHY layer unit 502-1 of the switch 500 and the wake-up signal may be a PHY layer signal. The PHY layer unit 502-1 of the switch 500 may transmit the generated wake-up signal to the PHY layer unit 531-1 of the end node 530 (S704).

The PHY layer unit 531-1 of the end node 530 may receive the wake-up signal, and may identify the identifier indicating the wake-up reason REASON1 included in the wake-up signal. The PHY layer unit 531-1 of the end node 530 may identify the target end node (e.g., the end node 530) based on the wake-up table. When the target end node indicated by the wake-up signal is the end node 530, the PHY layer unit 531-1 of the end node 530 may wake up the controller unit 534 of the end node 530.

Meanwhile, the PSE 502-2 of the switch 500 may supply the power to the PD 532 of the end node 530 (S705). The PD 532 of the end node 530 may acquire the power from the PSE 502-2 of the switch 500. The PSE 533 of the end node 530 may not supply a power because the power supply from the PSE 553 is indicated to '0' by the wake-up table.

Next, methods for selectively waking up a communication node without information exchange between PD and PSE based on a wake-up table of end nodes connected in a daisy chain scheme in a star topology will be described.

FIG. 8 is a sequence chart illustrating various exemplary embodiments of an operation method of a communication node in the vehicle network of FIG. 5.

As shown in FIGS. 5 and 8, a vehicle network of FIG. 8 may be the same as or similar to the vehicle network of FIG. 5. An end node 510 of FIG. 8 may be the end node 510 of FIG. 5, an end node 530 of FIG. 8 may be the end node 530 of FIG. 5, an end node 540 of FIG. 8 may be the end node 540 of FIG. 5, an end node 550 of FIG. 8 may be the end node 550 of FIG. 5, and a switch 500 of FIG. 8 may be the switch 500 of FIG. 5.

When a wake-up event occurs, the controller unit 512 of the end node 510 may be woken up by the wake-up event, and may identify a wake-up reason in accordance with the wake-up event. When it is determined to be necessary to wake up another end node after identifying the wake-up reason, the controller unit 512 of the end node 510 may wake up the PHY layer unit 511 of the end node 510, and transmit an identifier indicating the wake-up event to the PHY layer unit 511 of the end node 510. The PHY layer unit 511 of the end node 510 may be woken up, and generate a wake-up signal. The wake-up signal may be generated based on the above-described wave-up table (i.e., Table 3 or Table 4).

Table 3 may be a wake-up table for the end node 520, the end node 530, the end node 540 and the end node 550 connected to the switch 500 as shown in FIG. 5. The wake-up table may store a wake-up reason corresponding to each wake-up event, a target end node to be woken up by each wake-up reason, and an operation power configured to be supplied to the target end node. The operation power supplied between the switch 500 and each of the end nodes 520, 530, 540, and 550 may be as shown in Table 3. For example, when the wake up event D occurs, it may correspond to the wake-up reason REASON3. Thus, the fifth end node 550 (i.e., the end node #5) may be the target end node. When the end node 550 is determined as the target end node, the PSE 502-2 of the switch 500 may supply a power corresponding to P5 (i.e., the operation power of the end node 550) to the PD 532 of the end node 530.

Table 4 may be a wake-up table for the end node 520, the end node 530, the end node 540 and the end node 550 connected to the switch 500 as shown in FIG. 5. As compared with Table 3, Table 4 may further include a minimum power to be supplied to the target end node. For example, when the wake up event D occurs, it may correspond to the wake up reason REASON3. Thus, the fifth end node 550 (i.e., the end node #5) may be the target end node. When the end node 550 is determined as the target end node, the PSE 502-2 of the switch 500 may supply a power corresponding to (P0+P5) (i.e., a sum of the operation power P5 of the end node 550 and the minimum power P0) to the PD 532 of the end node 530. Meanwhile, even when the power to be supplied by the PSE 503-2 of the switch 500 is denoted as '0' according to Table 4, the PSE 503-2 of the switch 500 may be required to supply the power corresponding to P0 (i.e., the minimum power).

The wake-up event detected by the end node 510 may be 'D' in Table 4. In the present case, the PHY layer unit 511 of the end node 510 may generate a wake-up signal based on the wake-up table, including an identifier indicating the wake-up reason REASON3 corresponding to the wake up event D (S801). The wake-up table may be stored in a memory of PHY layer unit 511 of end node 510, and the wake-up signal may be a PHY layer signal. The PHY layer unit 511 of the end node 510 may transmit the generated wake-up signal to the PHY layer unit 501 of the switch 500 (S802).

The PHY layer unit 501 of the switch 500 may receive the wake-up signal. The PHY layer unit 501 of the switch 500 receiving the wake-up signal may identify the identifier indicating the wake-up reason REASON3 included in the wake-up signal. The PHY layer unit 501 of the switch 500 may identify the target end node (e.g., the end node 550) and the power (e.g., P5) to be supplied to the target end node based on the wake-up table (S803). When a power for the target end node is available, the PHY layer unit 501 of the switch 500 may wake up the controller unit 504 of the switch 500. Since the power to be supplied to the target end node may be immediately identified based on the wake-up table and the wake-up signal, the procedure of exchanging information between PD and PSE may not be performed. The PHY layer unit 501 of the switch 500 may transmit to the controller unit 504 of the switch 500 information on the target end node and the power to be supplied to the target end node. The controller unit 504 of the switch 500 may control the power supply unit 505 of the switch 500 to supply the power (e.g., P5) to be supplied to the target end node and the minimum power (i.e., P0) through the PSE 502-2 of the switch 500.

The PHY layer unit 502-1 of the switch 500 may generate a wake-up signal based on the wake-up table, including an identifier indicating the wake-up reason REASON3 corresponding to the wake-up event D. The wake-up table may be stored in a memory of PHY layer unit 502-1 of the switch 500, and the wake-up signal may be a PHY layer signal. The PHY layer unit 502-1 of the switch 500 may transmit the generated wake-up signal to the PHY layer unit 531-1 of the end node 530 (S804). Meanwhile, the PSE 502-2 of the switch 500 may supply the power (P0+P5) indicated by the wake-up table to the PD 532 of the end node 530 (S805).

The PHY layer unit 531-1 of the end node 530 may receive the wake-up signal. The PD 532 of the end node 530 may acquire the power from the PSE 503-2 of the switch 500. The PHY layer unit 531-1 of the end node 530 may identify the identifier included in the wake-up signal, indicating the wake-up reason REASON3. The PHY layer unit 531-1 of the end node 530 may identify the target end node (e.g., the end node 550) and the power (e.g., P5) to be supplied to the target end node based on the wake-up table (S806). Since the power to be supplied to the target end node may be immediately identified based on the wake-up table and the wake-up signal, the procedure of exchanging information between PD and PSE may not be performed. When the target end node indicated by the wake-up signal is the end node 550, the PHY layer unit 531-1 of the end node 530 may not wake up the controller unit 534 of the end node 530. Meanwhile, the PD 532 of the end node 530 may supply the acquired power to the PSE 533 of the end node 530.

The PHY layer unit 531-1 of the end node 530 may generate a wake-up signal based on the wake-up table, including an identifier indicating the wake-up reason REASON3 corresponding to the wake-up event D. The wake-up table may be stored in a memory of PHY layer unit 531-2 of the end node 530, and the wake-up signal may be a PHY layer signal. The PHY layer unit 531-2 of the end node 530 may transmit the generated wake-up signal to the PHY layer unit 541-1 of the end node 540 (S807). Meanwhile, the PSE 533 of the end node 530 may supply the power (P0+P5) indicated by the wake-up table to the PD 542 of the end node 540 (S808).

The PHY layer unit 541-1 of the end node 540 may receive the wake-up signal. The PD 542 of the end node 540 may acquire the power from the PSE 533 of the end node 530. The PHY layer unit 541-1 of the end node 540 may identify the identifier included in the wake-up signal, indicating the wake-up reason REASON3. The PHY layer unit 541-1 of the end node 540 may identify the target end node (e.g., the end node 550) and the power (e.g., P5) to be supplied to the target end node based on the wake-up table (S809). Since the power to be supplied to the target end node may be immediately identified based on the wake-up table and the wake-up signal, the procedure of exchanging information between PD and PSE may not be performed. When the target end node indicated by the wake-up signal is the end node 550, the PHY layer unit 541-1 of the end node 540 may not wake up the controller unit 544 of the end node 540. Meanwhile, the PD 542 of the end node 540 may supply the acquired power to the PSE 543 of the end node 540.

The PHY layer unit 541-2 of the end node 540 may generate a wake-up signal based on the wake-up table, including an identifier indicating the wake-up reason REASON3 corresponding to the wake-up event D. The wake-up table may be stored in a memory of PHY layer unit 541-2 of the end node 540, and the wake-up signal may be a PHY layer signal. The PHY layer unit 541-2 of the end node 540 may transmit the generated wake-up signal to the PHY layer unit 551 of the end node 550 (S810). Meanwhile, the PSE 543 of the end node 540 may supply the power (P0+P5) indicated by the wake-up table to the PD 552 of the end node 550 (S811).

The PHY layer unit 551 of the end node 550 may receive the wake-up signal, and may be woken up. The PD 552 of the end node 550 may acquire the power from the PSE 543 of the end node 540. The PHY layer unit 551 of the end node 550 may identify the identifier included in the wake-up signal, indicating the wake-up reason REASON3. The PHY layer unit 551 of the end node 550 may identify the target end node (e.g., the end node 550) based on the wake-up table. When the target end node indicated by the wake-up signal is the end node 550, the PHY layer unit 551 of the end node 550 may wake up the controller unit 553 of the end node 550.

The methods according to exemplary embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured for an exemplary embodiment of the present invention or may be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the operation of the present invention, and vice versa.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A communication node in a vehicle network, the communication node comprising:
   a physical (PHY) layer unit and a controller unit,
   wherein the PHY layer unit and the controller unit are configured to:
      detect, by the controller unit, a wake-up event;
      generate, by the PHY layer unit, a wake-up signal including an identifier indicating a wake-up reason corresponding to the wake-up event based on a wake-up table, the wake-up table configured for storing the wake-up reason corresponding to the wake-up event, a target communication node configured to be woken up by the wake-up reason, and an operation power configured to be supplied to the target communication node; and
      transmit, by the PHY layer unit, the wake-up signal,
   wherein the PHY layer unit and the controller unit are further configured to:
      after the detecting of the wake-up event, operate, by the controller unit, in an ON state based on the wake-up event;
      wake up, by the controller unit, the PHY layer unit of the communication node; and
      transmit, by the controller unit, information on the wake-up event to the PHY layer unit, and
   wherein the wake-up signal is generated and transmitted by the PHY layer unit.

2. The communication node of claim 1,
   wherein the wake-up signal is a PHY layer signal generated by the PHY layer unit of the communication node.

3. The communication node of claim 1,
   wherein the wake-up table further stores a minimum power to be supplied to the target communication node.

4. The communication node of claim 1,
   wherein the wake-up table is stored in a memory of the PHY layer unit of the communication node.

* * * * *